United States Patent [19]
Blume

[11] 3,718,938
[45] March 6, 1973

[54] COMBINED SHARPENERS FOR KNIVES AND FISH HOOKS AND HOOK DISGORGER

[76] Inventor: Mike C. Blume, Box 1125, Kissimmee, Fla. 32741

[22] Filed: June 21, 1971

[21] Appl. No.: 154,833

[52] U.S. Cl.............7/1 H, 43/53.5, 287/58 CT, 287/126, 51/181
[51] Int. Cl................................B25f 1/04
[58] Field of Search......7/1 H, 1 R; 43/53.5; 145/64; 287/58 CT, 126; 51/181, 211, 204, 205; 401/115, 92, 91, 95

[56] References Cited

UNITED STATES PATENTS

| 953,445 | 3/1910 | Stephan | 51/205 R |
|---|---|---|---|
| 2,398,583 | 4/1946 | Feather | 401/91 |
| 3,469,927 | 9/1969 | Aversa | 401/95 |

FOREIGN PATENTS OR APPLICATIONS

| 20,104 | 1897 | Great Britain | 401/115 |
|---|---|---|---|
| 748,609 | 12/1966 | Canada | 43/53.5 |
| 559,610 | 6/1923 | France | 7/1 H |
| 1,520,675 | 3/1968 | France | 43/53.5 |

Primary Examiner—Granville Y. Custer, Jr.
Assistant Examiner—Roscoe V. Parker, Jr.
Attorney—Stepno and Neilan

[57] ABSTRACT

A multi-purpose hand tool including a steel honing rod which is telescopingly received with a hollow handle tube for storage, a separate fish hook sharpening member attached to the handle tube, and a groove in the outer end of the honing rod to disgorge a hook from a fish's mouth. The honing rod may also be utilized as a fish holder while the fish is being scaled by inserting the rod into the fish through its mouth.

4 Claims, 3 Drawing Figures

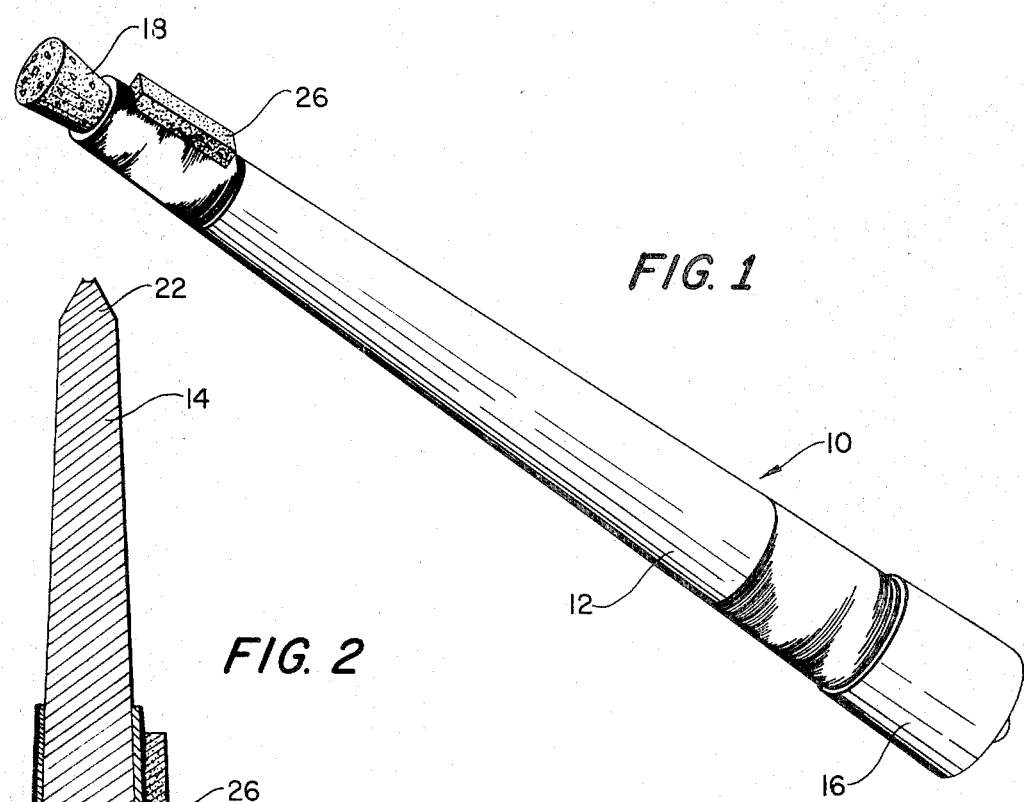

COMBINED SHARPENERS FOR KNIVES AND FISH HOOKS AND HOOK DISGORGER

The present invention relates to a multi-purpose tool which is especially adapted for use by fishermen and other sportsmen. The multi-purpose tool of the invention combines into a single compact device a telescopic knife sharpening steel or honing rod, a separate fish hook sharpener, and a groove at the outer end of the honing rod for use in disgorging a hook from a fish's mouth.

The present invention satisfies a need for an improved multi-purpose tool of the subject type for use by fishermen and others. Sharpening steels for knives and similar cutting implements are of course well known, as are devices for disgorging fish hooks. The present invention not only combines into a unitary structure apparatus for use in solving several problems frequently spaced by sportsmen in the field; but also provides for storage of the sharpening steel-disgorger into a compact structure. For example, if a conventional prior art sharpening steel or honing rod was carried in a fisherman's tackle box, it would be subject to possible rust due to exposure to the elements and to other possible injury to the honing surface due to rough handling. To overcome these problems, the present invention provides a telescopic arrangement of the honing rod and a handle tube so that the honing rod may be readily telescoped into the handle tube and the end of the tube sealed to protect the honing rod.

A Carborundum stone or the like is attached to the handle tube for use in sharpening fish hooks and the like and is positioned in such a way that it may function as a stop to limit insertion of the honing rod when the device is utilized to hold fish while fish are being scaled.

It is a primary object of the present invention to provide an improved multi-purpose tool which is especially adapted for use by sportsmen.

A further object of the present invention is to provide a novel sharpening device including a honing rod which may be telescoped into a handle for storage.

The above and other objects, features and advantages of the present invention will become more apparent as this description proceeds.

In the drawings:

FIG. 1 is a perspective view of a preferred embodiment of the invention with the honing rod retracted into its storage position.

FIG. 2 is a longitudinal cross-sectional view of the present invention but with the honing rod extending partially out of the handle tube.

FIG. 3 is a detail view on an enlarged scale showing the disgorger groove provided at the end of the honing rod.

Referring now to the drawings, the composite multi-purpose tool of the invention is generally designated by reference numeral 10 and includes as its major components a hollow handle tube 12 and a sharpening steel or honing rod 14. The handle tube has an annular tapering configuration with its larger end sealed by a plastic cap 16. Its smaller end is sealed by a cork 18 or any other suitable closure means when the honing rod 14 is in an inoperative position disposed within a tapering inner cavity 20 of the handle tube.

The honing rod 14 has a rounded tapering configuration which is complementary to the configuration of the cavity 20 adjacent the smaller end of the handle tube.

When one desires to utilize the apparatus of the invention and assuming that the honing rod 14 is in its retracted inoperative position within cavity 20 and that the cork 18 has been removed; the user grasps the handle tube 12 in one hand and snaps the tool downwardly with a flip of the wrist to cause the honing rod 14 to move out of the cavity 20 in the direction of the arrow illustrated in FIG. 2 into its operative position. The apparatus is designed so that the complementary taper of the honing rod and of the smaller end of cavity 20 results in a frictional engagement so that the honing rod when it reaches its operative extended position will remain in this position even if the apparatus is held vertically with the honing rod uppermost. The honing rod has a pointed outer tip 22 which is provided with a small groove 24 as best seen in FIG. 3. This groove may be e.g. an eighth of an inch in width. The groove 24 may be utilized as a fish hook disgorger as will be appreciated by those skilled in the art.

A fish hook sharpening member 26 which in the illustrated embodiment is a small piece of Carborundum stone is attached to the handle tube 12 adjacent its smaller end.

The handle tube 12 may be made of any suitable material but it is presently preferred to utilize a tapered fiberglas tube. The honing rod 14 may be comprised of a Sheffield sharpening steel but equivalent devices may also be employed.

The operation of the device to sharpen knives, etc., to disgorge fish hooks, and to sharpen fish hooks is believed obvious from the foregoing description. The device may also be utilized as a fish holder by inserting the extended honing rod 14 into a fish's mouth towards the tail of the fish. With the fish held in this position, the fish may be descaled more conveniently.

In view of the foregoing description, it will be seen that there has been provided a compact, novel, multi-purpose hand tool. While a presently preferred embodiment of the invention has been shown and described with particularity, it will be appreciated that various changes and modifications may readily suggest themselves to those of ordinary skill in the art upon being appraised of the present invention. It is intended to encompass all such changes and modifications as fall within the scope and the spirit of the appended claims.

What is claimed:

1. Apparatus comprising an elongated honing rod tapering in cross-section from one end towards the other, a handle tube having an inner cavity in which said honing rod telescopes into an inoperative storage position, said inner cavity having a taper complementary to that of said honing rod so that when said honing rod is in an extended operative position with its smaller end projecting from said handle tube said honing rod is maintained in an operative position by engagement with the inner wall of said handle tube.

2. Apparatus according to claim 1, wherein said honing rod has a tip portion at its smaller end, said tip portion being provided with a groove constituting a fish hook disgorger.

3. Apparatus according to claim 1, further comprising means for sharpening a fish hook connected to the outside of said handle tube.

4. Apparatus according to claim 1, wherein said honing rod has a tip portion at its smaller end, said tip portion being provided with a fish hook disgorging groove, a fish hook sharpening block connected to said handle tube at its smaller end, and means closing the other end of said handle tube.

* * * * *